United States Patent [19]

Rayner et al.

[11] Patent Number: 5,044,817
[45] Date of Patent: Sep. 3, 1991

[54] THREADED BUSH ASSEMBLY FOR SHAFT MOUNT

[75] Inventors: David A. Rayner; Rodney Chester, both of North Humberside, England

[73] Assignee: J. H. Fenner & Co. Limited, Hull, England

[21] Appl. No.: 461,393

[22] Filed: Jan. 5, 1990

[30] Foreign Application Priority Data

Jan. 5, 1989 [GB] United Kingdom ............... 8900171

[51] Int. Cl.$^5$ .............................................. F16B 2/06
[52] U.S. Cl. ...................................... 403/370; 403/371
[58] Field of Search ............... 403/370, 371, 367, 368, 403/374, 16, 369

[56] References Cited

U.S. PATENT DOCUMENTS

| 2,434,152 | 1/1948 | Forry | 403/370 |
| 2,709,607 | 5/1955 | Wikander . | |
| 2,819,090 | 1/1958 | Stenberg . | |
| 3,460,300 | 8/1969 | Howlett | 403/371 X |
| 3,638,974 | 2/1972 | Stratienko . | |
| 4,407,603 | 10/1983 | Lundgren | 403/370 |
| 4,464,140 | 8/1984 | Lundgren | 403/370 X |
| 4,514,109 | 4/1985 | McKenna . | |
| 4,598,443 | 7/1986 | Ostling et al. | 403/371 X |
| 4,626,114 | 12/1986 | Phillips | 403/370 X |

FOREIGN PATENT DOCUMENTS

| 2329940 | 1/1975 | Fed. Rep. of Germany . |
| 2537016 | 3/1977 | Fed. Rep. of Germany . |
| 1097196 | 2/1955 | France . |
| WO88/09444 | 12/1988 | PCT Int'l Appl. . |
| 2084293 | 4/1982 | United Kingdom . |
| 20987514 | 5/1982 | United Kingdom . |
| 2137312 | 10/1984 | United Kingdom . |

Primary Examiner—Peter M. Cuomo
Attorney, Agent, or Firm—Burns, Doane, Swecker & Mathis

[57] ABSTRACT

A threaded bush assembly for receiving and coupling a shaft to a rotatable hub includes a tubular sleeve member which is located within the rotatable hub and a tubular bush member adapted to be received in either end of the sleeve member. The bush member has a central bore in which the shaft is received and is axially moveable relative to the sleeve member by means of screw threaded members. The inner circumferential surface of the sleeve member and the outer circumferential surface of the bush member each have a helical thread formed thereon. The cross-section of both threads is defined by a pair of mutually opposed tapered surfaces. The two threads are screw threadedly engageable with one another, yet define a gap therebetween which enables relative axial movement of the two threads with respect to one another such that upon axial movement of the bush member relative to the sleeve member, one tapered surface of one thread wedges against the facing tapered surface of the other thread.

7 Claims, 3 Drawing Sheets

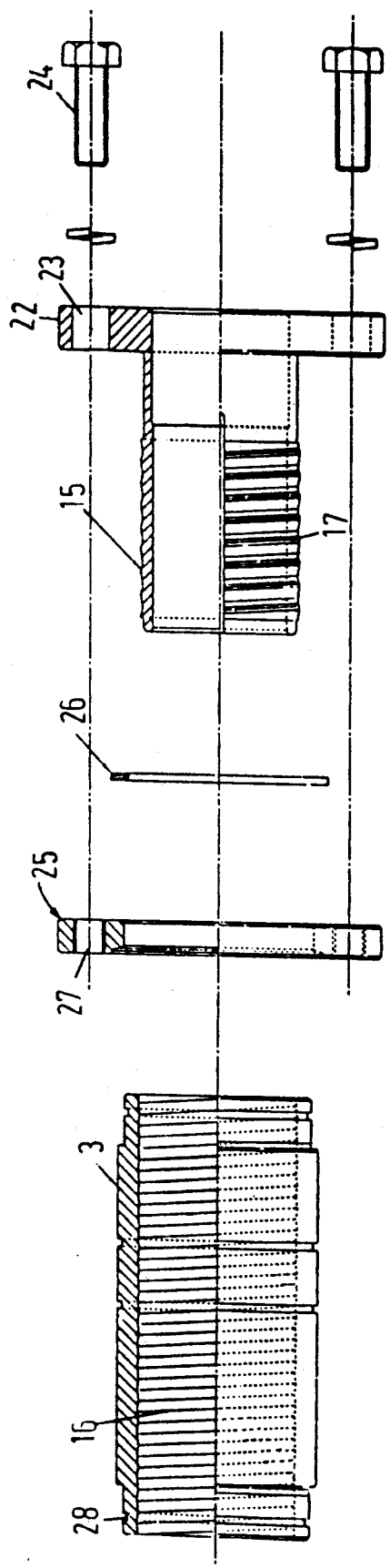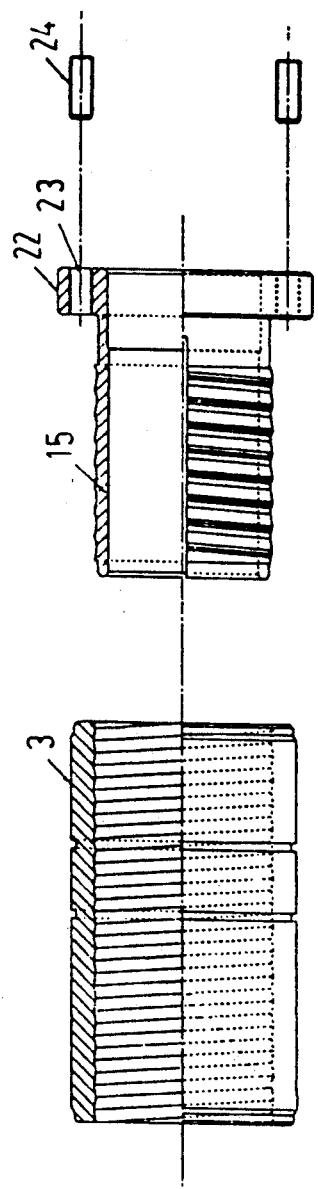

THREADED BUSH ASSEMBLY FOR SHAFT MOUNT

BACKGROUND OF THE INVENTION

The present invention relates to a threaded bush assembly and, more particularly, to a threaded bush assembly for receiving and coupling a shaft within a rotatable hub to rotatably couple the shaft to the hub.

FIELD OF THE INVENTION

The threaded bush assembly may have a broad range of applications and one such application is to permit a shaft mounted speed reducer to receive a driven or output shaft.

The coupling of pulleys, sprockets, coupling flanges and other machine elements to cylindrical shafts has been accomplished in the past through use of tapered, split bushes. An example of such a tapered, split bush is disclosed in U.K. Patent No. 592,912. Typically though, the length of the shaft received in the pulley hub is relatively short, making them unsuitable for use in receiving and coupling a shaft within a shaft mounted speed reducer.

U.S. Pat. Nos. 2,811,861, 3,590,652 and 4,452,547 disclose a tapered bush system for receiving and coupling a shaft to the output hub of a shaft mounted speed reducer. Those prior patents require the use of two tapered bushes and an arrangement for drawing the bushes into engagement with the shaft and the hub on both sides of the hub in order to accommodate the longer length of the shaft received in the hub. It will be readily apparent that it may not always be convenient or, indeed, practicable to gain access to both sides of the hub to tighten or loosen the bushes and thereby couple or uncouple the shaft to the hub. Furthermore, both bushes must be tightened in unison and uniformly torqued to predetermined torque levels.

A further problem arises when an attempt is made to remove the bushes from the shaft. In that situation, there is a tendency for one bush to resist the removal of the other bush because the shaft has become frozen to the bushes such that a loosening force on one bush acts as a tightening force on the other bush. From the foregoing discussion, it can be readily appreciated that the use of dual tapered bush systems results in additional parts, material, labor and costs, and that these systems are in many instances both inconvenient to install and difficult to remove.

In order to overcome the problems associated with dual tapered bush systems, single tapered bushes for receiving and coupling a shaft to the output hub of a shaft mounted speed reducer have been used. An example of such a single tapered bush is disclosed in U.S. Pat. No. 4,626,114. However, that particular system suffers from two main disadvantages. First, the tapered bush can only be fitted from the inboard side of the hub. Second, the walls of the bush are very thin at areas adjacent the end of the bush which may lead to problems during fabrication of the bush. In addition, the tapered bush can only be engaged between the hub and the shaft by tightening the bush towards the hub. A further problem associated with all single tapered bushes is that the outer tapered surface of the bush contacts the inner tapered surface of the hub over its entire length, thereby increasing the risk that the two surfaces will become frozen together.

OBJECTS AND SUMMARY OF THE INVENTION

In view of the foregoing disadvantages and drawbacks, it is an object of the present invention to provide a threaded bush assembly for receiving and coupling a shaft to a rotatable hub which can be fitted from either side of the hub, and which is capable of both push and pull engagement.

It is a further object of the present invention to provide a threaded bush assembly which is relatively easy to tighten and loosen, and which is not prone to freezing.

According to the present invention, the threaded bush assembly for receiving and coupling a shaft to a rotatable hub includes a tubular sleeve member which is located within the rotatable hub, a tubular bush member adapted to be received in either end of the sleeve member and having a central bore in which the shaft is received, and means for effecting axial movement of the bush member relative to the sleeve member. The inner circumferential surface of the sleeve member and the outer circumferential surface of the bush member have a continuous helical thread formed therein. In cross-section, each of the threads is defined by a pair of mutually opposed tapered surfaces. The two threads are threadedly engageable with one another, yet define a gap therebetween which enables relative axial movement of the two threads with respect to one another such that upon axial movement of the bush member relative to the sleeve member, one tapered surface of one thread is wedged against the facing tapered surface of the other thread.

The sleeve member may be located within and secured to the rotatable hub as a separate component as may be the case, for example, when the output gear constituting the rotatable hub is secured to the sleeve by circlips. Alternatively, the sleeve member may form an integral part of the rotatable hub as may be the case, for example, when the sleeve member and the rotatable hub are one and the same.

The bush member may be compressed onto the shaft by the wedging action that occurs between the bush member and the sleeve member. However, it is preferable to provide an axial split in the bush member which allows the bush member to close about and secure the shaft in its central bore.

Preferably, the threads have a symmetrical triangular cross-section. This ensures that the area of contact between one side of one thread and the facing side of the other thread is maximized. As a result, effective wedging action takes place between the sleeve member and the bush member. The symmetrical cross-section of the two threads enables the bush member to be secured relative to the sleeve member from either side, and further enables the wedging action to take place regardless of whether the bush member is moved axially towards or away from the sleeve member. This is a significant improvement over conventional tapered bush assemblies in which the bush member can only be secured relative to one side of the rotating hub and then only by axially moving the bush member towards the rotating hub. As will be readily appreciated, the threaded bush assembly of the present invention is capable of much greater versatility in use than conventional tapered bush assemblies.

To release or loosen the bush member from the sleeve member, the two members are simply moved in the axial direction relative to one another to release the wedging action between the threads. The bush member is then unscrewed from the end of the sleeve member on which it is received.

Preferably, the bush member includes a flange having a plurality of through holes therein, in each of which is received a screw threaded member. In a first embodiment of the present invention, each of the screw threaded members is screwed into a respective screw threaded hole in the sleeve member such that as the screw threaded members are tightened, they draw the bush member axially towards the sleeve member and thereby produce a wedging action between the threads. Conveniently, the screw threaded holes are located in a collar that is secured to or integrally formed with the sleeve member.

In an alternative embodiment, the through holes in the flange attached to the bush member are threaded and tapped and the screw threaded members are threadedly received in the tapped holes. As the screw threaded members are screwed into the tapped holes, the ends of the screw threaded members abut against the end of the sleeve member and effect a "jacking" action which causes the bush member to be pushed away from the sleeve member. The movement of the bush member away from the sleeve member causes the two threads to wedge against one another.

BRIEF DESCRIPTION OF THE DRAWINGS

Embodiments of the present invention will now be described, by way of example, with reference to the accompanying drawings, in which like elements bear like reference numerals and wherein:

FIG. 2 is an exploded view of the threaded bush system of FIG. 1;

FIG. 5 is an exploded view of the threaded bush system of FIG. 2.

DETAILED DESCRIPTION OF THE PREFERRED EMBODIMENTS

Figure 1:
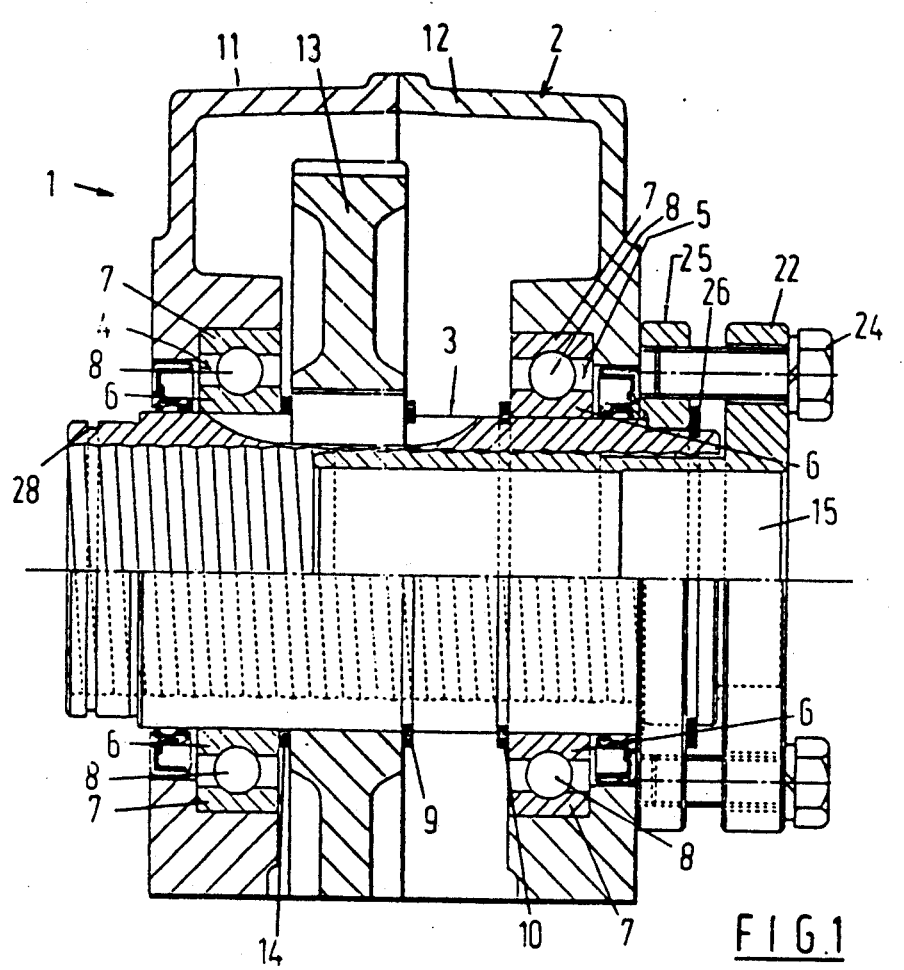
FIG. 1 is a partial cross-sectional view of a shaft mounted speed reducer that includes a threaded bush system in accordance with a first embodiment of the present invention.

Referring to FIG. 1 of the accompanying drawings, a shaft mounted speed reducer, generally indicated by reference 1, is shown in partial cross-section. The speed reducer 1 includes a housing 2 and a power output hub or sleeve 3 which is rotatably mounted in the housing 2 by way of a pair of anti-fraction roller bearings 4, 5. Each of the roller bearings 4, 5 is substantially identical and includes an inner race 6 which is carried by and secured to the output hub 3 and an outer race 7 which is received in and secured to an appropriate recess in the housing 2. A plurality of roller elements 8 are positioned between the inner race 6 and the outer race 7 such that the output hub 3 is free to rotate relative to the housing 2. The output hub 3 is axially fixed within the housing 2 by means of retaining rings or circlips 9, 10, each of which is received in a respective groove in the output hub 3. The housing 2 is comprised of two parts 11, 12 which are connected together by bolts (not shown).

An output gear 13 is mounted on and secured to the output hub 3 between two circlips 9,14 which are also received in respective grooves in the output hub 3. As is conventional, the output gear 13 forms a part of a speed reducing gear chain (not shown) which is connected to a power input shaft (also not shown). The speed reducing gear chain is journaled for rotation within the housing 2 such that the input shaft drives the output hub 3 at a predetermined reduced speed with a resulting increase in output torque. The power input shaft is connected to the drive shaft of an electric motor or other prime mover (not shown) by any of several well known means.

As is conventional, the output hub 3 receives and is coupled to the driven shaft (not shown) of a particular device to be driven by the above noted prime mover. The driven shaft is secured to the output hub 3 by means of a single piece bush 15 which will be described in more detail below.

Figure 3:
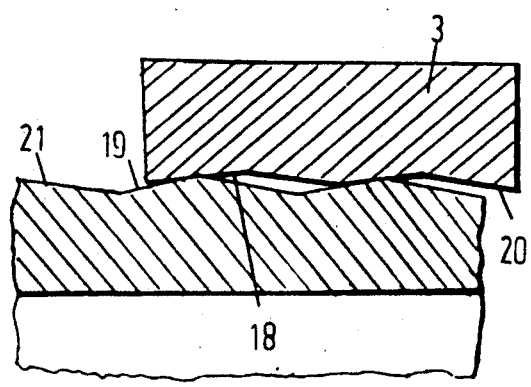
FIG. 3 is an enlarged cross-sectional view of a portion of the engaging surfaces of the bush and the sleeve of the threaded bush system according to the present invention.

Referring to FIGS. 2 and 3 in combination with FIG. 1, it will be seen that a continuous helical thread, indicated generally by reference 16, is formed on the inner circumferential surface of the output hub 3. An enlarged detail of the profile of the thread 16 is shown in FIG. 3. As can be seen, the thread 16 is essentially triangular and symmetrical in cross-section. In this particular embodiment, the pitch of the threads is eight millimeters and each side of each thread is inclined at an angle of ten degrees.

A bush 15 is screwed into the output hub 3. The bush 15 has a helically extending thread 17 formed on its outer circumferential surface that matches and is substantially identical to the thread 16 on the inner surface of the hub 3.

As may be ascertained from FIG. 3, although the threads 16, 17 are substantially identical, the inner diameter of the outer hub 3 is slightly greater than the outer diameter of the bush 15. As a result, the threads 16, 17 are able to move axially with respect to each other. Moreover, by sliding the bush 15 axially relative to the output hub 3, the opposing surfaces 18, 19 of each thread 16, 17 are brought into engagement and wedge against one another. The wedging action produced by the engagement of the opposing surfaces 18, 19 of each thread 16, 17 secures the outer hub 3 to the bush 15.

It should be apparent that the symmetrical profile of the threads 16, 17 enables the bush 15 to be screwed into the output hub 3 from either side of the output hub 3, and also permits the bush 15 to be secured relative to the output hub 3 by relative axial movement of the bush 15 either into or out of the output hub 3. When the bush 15 is moved axially into the hub 3, the opposing surfaces 18, 19 of the threads 16, 17 engage one another, whereas when the bush 15 is moved axially out of the output hub 3, opposing surfaces 20, 21 of the threads 16, 17 are brought into engagement and wedged together. This is a significant advantage over conventional tapered bush assemblies in which the bush member can only be secured on one side of the hub member and then only by pushing the bush member into the hub member. It can be readily appreciated, therefore, that the threaded bush assembly of the present invention is capable of much greater versatility in use than conventional tapered bush assemblies.

An integrally formed flange 22 is provided at one end of the bush 15 and a plurality of through holes 23 are provided in the flange 22. A threaded fastener or bolt 24 is received in each of the through holes 23. A collar 25 is carried by and secured to the end of the output hub 3 in which the bush 15 is received. Axial movement of the collar 25 is restricted by means of a circlip 26. A plurality of threaded holes 27 are provided in the collar 25. Each one of the through holes 23 in the flange 22 is aligned with one of the threaded holes 27 in the collar 25. Each of the bolts 24 is screwed into a respective one of the threaded holes 27 in the collar 25 such that upon tightening the bolts 24 in a generally uniform manner, the bush 15 is forced axially into the output hub 3, thereby bringing the opposed surfaces 18, 19 of the threads 16, 17 into face to face engagement In order that the bush 15 may be inserted from the other side of the output hub 3, the opposite end of the output hub 3 is profiled to receive the collar 25 and a groove 28 is provided to receive the circlip 26 which secures the collar 25 in place. To facilitate axial movement and locking of the bush 15 relative to the output hub 3 when the bush 15 is moved away from the output hub 3, a locking nut may be provided on each bolt 24, for purposes of being tightened against the surface of the collar 25 or the flange 22 once the bolt 24 is suitably engaged in the screw threaded hole 27 in the collar 25.

Figure 4:
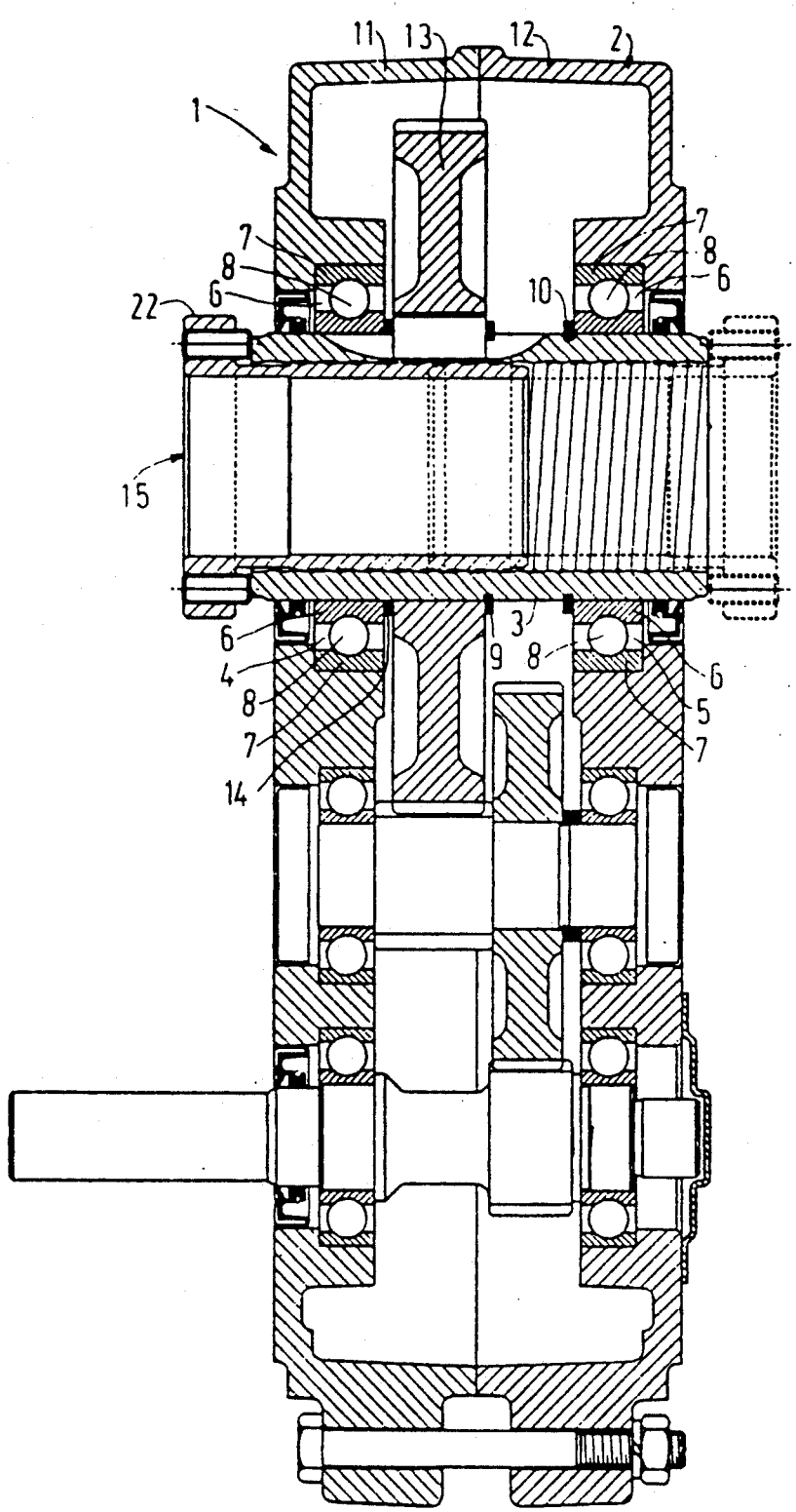
FIG. 4 is a partial cross-sectional view of a shaft mounted speed reducer that includes a threaded bush system in accordance with a second embodiment of the present invention.

Referring now to FIGS. 4 and 5 of the accompanying drawings, an alternative embodiment of the threaded bush assembly according to the present invention is illustrated. In FIG. 4, the speed reducer 1 has been shown in detail. However, because the speed reducer is of essentially conventional design, a detailed description is not considered necessary and thus, is not included. For purposes of simplicity and clarity, the features of this embodiment that are similar to the features shown in the first embodiment have been designated with the same reference numerals and a description of those features is not duplicated here.

The embodiment of FIGS. 4 and 5 differs from the embodiment illustrated in FIGS. 1-3 in that the collar 25 is not utilized and the through holes 23 in the flange 22 carried by the bush 15 are threaded and tapped. Each of the tapped and threaded holes 23 threadedly receive a screw threaded member 24 in the form of a grub screw. As the grub screws 24 are screwed into the screw threaded holes 23 in the flange 22, the ends of the grub screws 24 abut against the facing surface of the output hub 3, thereby effecting a "jacking" action which causes the bush member 15 to move axially out of the output hub 3. The outward axial movement of the bush member 15 gives rise to a wedging action between the thread on the bush member 15 and the thread on the output hub 3. As a result, the bush member 15 is compressed onto the shaft and locks the bush assembly together.

It may be desirable in some situations to provide an axial split in the bush member 15 to facilitate compression of the bush member 15 onto the shaft. As the bush member 15 is compressed within the sleeve member, the split would permit the bush member 15 to close about the shaft.

It has been found that a suitable angle of inclination for the tapered surfaces of the two threads is ten degrees. This effects a suitable torque carrying capacity for most loads. However, if the angle of inclination is reduced, the degree of locking is increased and the torque carrying capacity is greatly increased, though greater care must be exercised in machining the threads and the assembly is more likely to freeze.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention. Accordingly, it is expressly intended that all such variations and changes which fall within the spirit and scope of the present invention as defined in the claims, be embraced thereby.

What is claimed is:

1. A threaded bush assembly for receiving and coupling a shaft to a rotatable hub, comprising:
   a tubular sleeve member adapted to be located within the rotatable hub;
   a tubular bush member adapted to be received in the sleeve member, said bush member having a central bore in which the shaft is received; and,
   means for effecting axial movement of the bush member relative to the sleeve member, the inner circumferential surface of the sleeve member and the outer circumferential surface of the bush member each having a helical thread formed thereon, each thread being defined by a pair of mutually opposed tapered surfaces when viewed in cross-section, the pair of mutually opposed tapered surfaces of the thread formed on the outer circumferential surface of the bush member forming substantially the same angle with the longitudinal axis of the bush member and the pair of mutually opposed tapered surfaces of the thread formed on the inner circumferential surface of the sleeve member forming substantially the same angle with the longitudinal axis of the sleeve member so that the bush member can be screwed into the sleeve member from either end thereof with the two threads being threadedly engageable with one another, the inner diameter of the sleeve member being slightly greater than the outer diameter of the bush member to define a gap between facing tapered surfaces of the two threads to permit relative axial movement of the two threads with respect to one another such that upon axial movement of the bush member into or out of the sleeve member the tapered surfaces which face one another in the direction of axial movement effect a wedging action.

2. A threaded bush assembly according to claim 1, wherein the sleeve member is located within and is secured to the rotatable hub as a separate component.

3. A threaded bush assembly according to claim 1, wherein the sleeve member forms an integral part of the rotatable hub.

4. A threaded bush assembly according to claim 1, wherein the bush member is axially split to permit the bush member to close about and secure the shaft in its central bore.

5. A threaded bush assembly according to claim 1, wherein the threads are symmetrical and triangular in cross-section.

6. A threaded bush assembly according to claim 1, including a collar positioned on the sleeve and having a plurality of threaded holes extending therethrough, and a flange attached to and extending radially outwardly from one end of the bush member, said flange having a plurality of through holes extending therethrough that are aligned with the threaded holes in the collar, said means for effecting axial movement of the bush member relative to the sleeve member including a plurality of screw threaded members, each of which extends through one of the through holes and threadedly engages the aligned threaded hole in the collar so that as the screw threaded members are rotated to move the bush member axially towards the sleeve member, the one tapered surface of the thread on the bush member wedges against the facing tapered surface of the thread on the sleeve member.

7. A threaded bush assembly according to claim 1, including a flange attached to and extending radially outwardly from one end of the bush member, said flange having a plurality of threaded and tapped holes extending therethrough, said means for effecting axial movement of the bush member relative to the sleeve member including a plurality of screw threaded members, each of which threadedly engages one of the threaded and tapped holes in the flange so that as the screw threaded members are rotated, front faces of the screw threaded members engage a facing end of the sleeve member to cause the bush member to be pushed away from the sleeve member, thereby wedging one tapered surface of the thread on the bush member against the facing tapered surface of the thread on the sleeve member.

* * * * *